Patented Nov. 30, 1926.

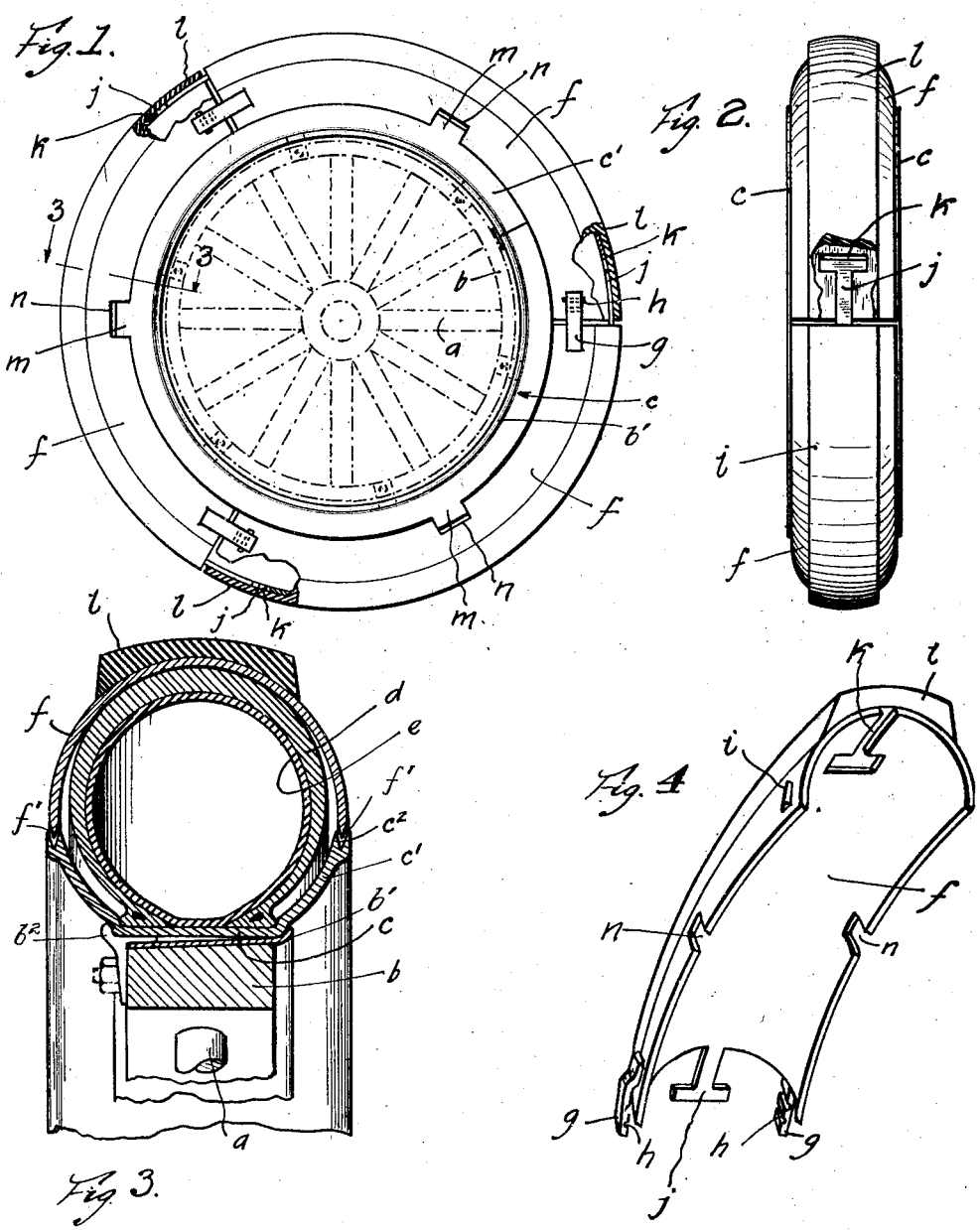

1,608,990

UNITED STATES PATENT OFFICE.

FLOYD MOTT, OF PORTLAND, OREGON.

TIRE ARMOR.

Application filed October 27, 1924. Serial No. 746,105.

The object of my invention is to provide a covering or auxiliary armor or protective tread for pneumatic tire vehicle wheels which will serve as an external armor for said tire to prevent the puncturing of the tire and which will provide a hollow support for that portion of the vehicle, when the tire becomes accidentally deflated, thus preventing undue wear on the deflated tire.

I attain my object by combining with the pneumatic tire of a vehicle wheel, a rim mounted on the felly of the wheel, said rim provided with extended sides, a protective armor for the tire composed of sections adapted for mounting on said rim-sides, means for holding the edges of the armor-section in engagement with the said rim-sides, the rim-sides and the sides of the armor-sections being provided with radial cooperating recess and lug respectively, means movably connecting the adjacent ends of the sides of the rim-sections, and means movably connecting the adjacent ends of the tread portions of the armor-sections.

The details of construction and mode of operation of my invention are hereinafter described with reference to the accompanying drawings, in which:

Fig. 1 is a side elevation of a pneumatic tire vehicle wheel with my auxiliary tread in position, parts of the tread being broken away to disclose details of construction;

Fig. 2 is an edge elevation of the vehicle wheel and also has parts broken away to disclose details of construction;

Fig. 3 is a larger scaled section through the wheel taken substantially on the line 3—3 of Fig. 1;

Fig. 4 is a perspective view of one section of the cover looking from the inside.

My auxiliary armor or protective tread is adapted to be mounted on a vehicle wheel $a$ provided with a felly $b$. Upon said felly $b$ is a felly band $b'$ arranged with a rim member $c$ mounted thereon. Said rim $c$ has an integral side portion $c'$ extending upward at each side of the wheel, and the peripheral extremities of said extended sides are provided with a longitudinal groove $c^2$. Said rim member $c$ thus serves not only to hold the pneumatic tire $d$ of the wheel in position but also serves partially to encompass the interior part of said tire to serve as an armor therefor. Said rim $c$ is held in place upon the felly band $b'$ by clamps $b^2$, and said pneumatic tire is provided with the usual inner tube $e$.

Mounted about the tire and astraddle thereof is my protective tread which is made up of a plurality of metal sections $f$ of such length that their edges do not abut when mounted about a fully inflated tire as is shown in Fig. 1. These armor sections are connected together by yieldable spring clips $g$ provided with a plurality of notches $h$ as shown in Fig. 4. The spring clips are adapted to engage with lugs $i$ provided on one end of each of the armor sections. T-shaped connections $j$ are provided at the jointure of the abutting sections also which fit in similarly shaped recesses $k$ on the abutting sections and also tend to hold the sections together. The sections $j$ do not fit closely within the recess however and thus permit the abutting edges of the sections to be spaced apart by the pressure of the pneumatic tire, when it is inflated and also permit said edges to abut to support the weight of a portion of the vehicle when the tire becomes deflated.

I provide a resilient tread $l$ upon the periphery of each of these sections for the purpose of eliminating jar of the vehicle. Radial projections $m$ are struck out about the rim $c$ and engage radial notches $n$ in each of the armor sections $f$. The projection $m$ is of lesser height than the depth of the recess $n$ and thus permits the armor sections to move radially relatively to the rim sections to permit the spacing of the abutting edges of the adjacent sections as hereinbefore referred to.

The operation of my device is as follows:

When the tire $d$ is deflated and the sections $f$ are mounted astraddle of the same with their beveled edges $f'$ entering the longitudinal recesses $c^2$ of the sides $c'$ as shown in Fig. 3, the spring like clips $g$ engage the lugs $i$ on the abutting edge of the adjacent armor section and the recesses $n$ are arranged to receive the lugs $m$ of the rim sides $c'$. The tire is then inflated to its proper degree which spaces the abutting edges and thus the vehicle is supported by the resilient pneumatic tires.

The clips $g$ are adapted so that in engaging with the lugs $i$ they merely serve to hold the armor sections movably together. The lugs $m$ are sufficiently shorter than the recesses n to accommodate such movement. The tongues j in locking with the recesses k hold the armor sections against outward displacement while the inflated tire supports the armor sections against collapsing inward. When the tire is deflated the armor sections come together and form a rigid whole.

I claim:

1. In combination with a pneumatic tire for wheels, a rim mounted on the felly of the wheel, said rim provided with extended sides, a protective armor for the tire composed of sections adapted for mounting on said rim-sides, means for holding the edges of the armor-section in engagement with the said rim-sides, the rim-sides and the sides of the armor-sections being provided with radial cooperating recess and lug respectively, means movably connecting the adjacent ends of the sides of the rim-sections, and means movably connecting the adjacent ends of the tread portions of the armor-sections.

2. In combination with a pneumatic tire for wheels, a rim mounted on the felly of the wheel, said rim provided with extended sides, the peripheral edges of which are provided with longitudinal grooves, a protective armor for the tire composed of sections adapted for mounting on the said grooved edges of said rim-sides, the rim-sides and the sides of the armor-sections being provided with radial cooperating recess and lug, respectively, means movably connecting the adjacent ends of the sides of the rim-sections, and means movably connecting the adjacent ends of the tread portions of the armor-sections.

3. In combination with a pneumatic tire for wheels, a rim mounted on the felly of the wheel, said rim provided with extended sides, a protective armor for the tire composed of sections adapted for mounting on said rim-sides, means for holding the edges of the armor-section in engagement with the said rim-sides, the rim-sides and the sides of the armor-sections being provided with radial cooperating recess and lug respectively, the adjacent ends of the sides of the armor-sections being provided with cooperating spring-clip and lug, respectively, and means movably connecting the adjacent ends of the tread portions of the armor-sections.

4. In combination with a pneumatic tire for wheels, a rim mounted on the felly of the wheel, said rim provided with extended sides, a protective armor for the tire composed of sections adapted for mounting on said rim-sides, means for holding the edges of the armor-section in engagement with the said rim-sides, the rim-sides and the sides of the armor-sections being provided with radial cooperating recess and lug respectively, means movably connecting the adjacent ends of the sides of the rim-sections, and the adjacent ends of the tread portions of the armor-sections being provided with cooperating T-shaped tongue and slot, respectively.

5. In combination with a pneumatic tire for wheels, a rim mounted on the felly of the wheel, said rim provided with extended sides the peripheral edges of which are provided with longitudinal grooves, a protective armor for the tire composed of sections adapted for mounting on the said grooved edges of said rim-sides, the rim-sides and the sides of the armor-sections being provided with radial cooperating recess and lug respectively, the adjacent ends of the sides of the armor-sections being provided with cooperating spring-clip and lug, respectively, and the adjacent ends of the tread portions of the armor-section being provided with cooperating T-shaped tongue and slot, respectively.

FLOYD MOTT.